Patented Mar. 9, 1943

2,313,605

UNITED STATES PATENT OFFICE 2,313,605

TREATMENT OF N-MONOMETHYL-P-AMINOPHENOL

Thomas Elliott Wannamaker, Orangeburg, S. C., assignor to Eastman Kodak Company, Rochester, N. Y., a corporation of New Jersey No Drawing. Application March 18, 1939, Serial No. 262,787

12 Claims. (Cl. 260—574)

This invention relates to the treatment of materials containing N-monomethyl-p-aminophenol and more particularly to procedure for treating N-monomethyl-p-aminophenol which contains impurities to obtain an improved product therefrom.

N-monomethyl-p-aminophenol and salts such as its sulfate, are known in the industry under various trade names as "Elon" and "Metol." These chemical compounds are active reducing agents and are used for photographic and other purposes. Various methods for the manufacture of these compounds are known, as for example methods described in U. S. Patents 1,297,685 and 1,497,252. The N-monomethyl-p-aminophenol obtained from various methods and under various conditions may contain certain impurities. The impurity to be noted in particular is s-dimethyl-p-phenylenediamine and other compounds volatile in steam. This constructstituent is detrimental and not desired even in small quantities. It is readily apparent, therefore, that a process which is capable of converting N-mono-methyl-p-aminophenol and analogous aminophenols to products free of detrimental impurities is advantageous and desirable.

I have found a procedure for treating N-monomethyl-p-aminophenol and its salts to separate phenylenediamine derivatives and to obtain an improved product therefrom.

This invention has for one object to provide a process for obtaining an improved grade of N-monomethyl-p-aminophenol from sources thereof contaminated with steam volatile phenylenediamine derivatives. Still another object is to provide a process of purification which will eliminate even small quantities of said derivatives from N-monomethyl-p-aminophenol or its salts. Still another object is to provide a process of treating N-monomethyl-p-aminophenol or its salts, containing undesired phenylenediamine constituents, which is adapted to continuous operation for the separation thereof. Other objects will appear hereinafter.

I have found that N-monomethyl-p-aminophenol, which is contaminated with the aforesaid detrimental impurities, may be treated by the method of my invention including the use of chemicals, steam and crystallization to obtain an improved and high-grade product therefrom.

For a more complete understanding of my invention, reference is made to the following example, which is set forth primarily for illustrating one preferred method of carrying out my process.

The N-monomethyl-p-aminophenol to be treated in this particular case was contaminated with s-dimethyl-p-phenylenediamine. About 2 or 3% of this constituent was present. The impure aminophenol was treated with an alkali hydroxide. Sodium hydroxide was used in this example. The N-monomethyl-p-aminophenol reacted with the hydroxide to form the sodium salt. However, the impurity, s-dimethyl-p-phenylenediamine, already being saturated and incapable of forming an alkali salt, did not so react and remained capable of being removed by steam.

The constituents after reaction with the alkali hydroxide as specified, were conducted to a feed tank positioned above a stripping column. An ordinary packed column or plate and bell fractionating column may be used. For example, a single bell, 20-plate column would be useful for the purification of 80–100 lbs. of N-monomethyl-p-aminophenol contaminated with a few per cent impurities as indicated in the present example.

The sodium salt of the p-aminophenol in solution in the feed tank was passed countercurrent to steam injected into the bottom of the column. The phenylenediamine constituent was volatile with the steam and the solution issuing at the base of the column was substantially free thereof.

I have found using a column as specified, that ordinary pressures may be employed and that proportionately low amounts of steam will serve to remove the volatile phenylenediamine impurity. For example, a ratio of steam to aminophenol compound being not materially greater than approximately 1–30, by weight, is satisfactory. This represents substantially lower steam requirement than has been employed heretofore.

The sodium salt of N-monomethyl-p-aminophenol, now freed of the volatile phenylenediamine and other compounds volatile with steam is conducted to a container wherein it is treated with inorganic acid. Sulfuric acid is preferred, inasmuch as the N-monomethyl-p-aminophenol sulfate is obtained in aqueous solution along with a content of sodium sulfate.

I have found that the N-monomethyl-p-aminophenol sulfate and sodium sulfate may be recovered separately from this aqueous solution of the two components, due to their differences in change of solubility with respect to temperature. I have found that the solubility equilibrium of N-monomethyl-p-aminophenol sulfate in water is decreased by the presence of sodium sulfate, sodium sulfate when present in suitable concentration causing the separation or "salting out" of the N-monomethyl-p-aminophenol sulfate in solid form.

In further detail, N-monomethyl-p-aminophenol sulfate and sodium sulfate may be recovered separately from an aqueous solution of the two components due to the differences in change of solubility with respect to temperature. The solubility of N-monomethyl-p-aminophenol sulfate in water decreases very rapidly between the temperature range of 100° C. to 33° C. and then very slowly from 33° C. to 0° C. The solubility of sodium sulfate is practically constant between the range of 100° C. to 33° C. but decreases very rapidly from 33° C. to 0° C.

From the above it is possible to cool a mixed solution down to 33° C. at which temperature the N-monomethyl-p-aminophenol sulfate is crystallized out and may be separated, while the sodium sulfate remains substantially in solution. The mother liquor may then be cooled to 0° C. at which temperature most of the sodium sulfate crystallizes and may be separated.

The sodium sulfate in high concentrations has the added advantage of salting out the N-monomethyl-p-aminophenol sulfate, thereby decreasing the minimum solubility at 33° C. to such an extent that the solubility of N-monomethyl-p-aminophenol sulfate actually increases between 33° C. and 10° C. as the sodium sulfate is removed. In other words, the solubility of sodium sulfate is higher between the range of 100° C.–33° C. but decreases rapidly from 33° C. to 0° C. As indicated, the presence of sodium sulfate exaggerates the change in solubility of the N-monomethyl-p-aminophenol sulfate. The mixture of the N-monomethyl-p-aminophenol sulfate, i. e., "Elon," and sodium sulfate, comprises an aqueous solution and as indicated, I have found that it is possible to cool a mixed solution such as is obtained from my sulfuric acid treatment preferably down to 33° C. but other temperatures within the range of, for example, 32° C.–40° C., and even lower, depending upon the concentration of sodium sulfate, may be employed. At these temperatures the N-monomethyl-p-aminophenol sulfate is crystallized out and may be separated while the sodium sulfate remains in solution. The residual liquor may then be cooled for example to some temperature below 25° C. and preferably within about 5° of 0° C., at which temperature a large part of the sodium sulfate, and in most instances the bulk of it, crystallizes and may be separated. The mother liquor obtained at this stage may contain a small proportion of "Elon" in solution and may be suitably treated to recover the "Elon."

The choice of the particular temperatures and conditions of crystallization, as already described in detail, in my process is an important feature for obtaining optimum results.

It is apparent from the preceding that I have provided a relatively simple and effective method whereby N-monomethyl-p-aminophenol contaminated with steam volatile impurities may be treated to eliminate these impurities and yield a product of desirable purity. The resultant product may be further treated if desired, as for example further purified by re-crystallization from water. The various crystals may be separated from the mother liquor by filtering, centrifuging or other procedure.

While the aforementioned examples represent preferred procedure, certain departures may be made. Other alkali materials such as potassium hydroxide, may be employed in place of the alkali described in certain of the steps set forth herein, as for example, prior to the steaming step. Also, the sulfuric acid may be entirely or partly replaced by other acid materials, as for example by the use of acid sodium sulfate.

It is therefore apparent that my invention is susceptible of being operated with some modification without impairing the novelty of my invention. Hence, I do not wish to be restricted excepting insofar as is necessitated by the prior art and the spirit of the appended claims.

What I claim and desire to be secured by Letters Patent of the United States is:

1. In a process for preparing N-monomethyl-p-aminophenol, the steps which comprise converting an N-monomethyl-p-aminophenol to its sulfate in admixture with water and alkali metal sulphate, cooling the mixture to a temperature from about 32° C.–40° C. whereby separation of aminophenol sulphate crystals is obtained.

2. In the process of preparing N-monomethyl-p-aminophenol, the steps which comprise converting an alkali metal N-monomethyl-p-aminophenate to an inorganic acid derivative by treatment thereof with an inorganic acid compound from the group consisting of inorganic acids and acid salts of inorganic acids, thereby obtaining an aqueous mixture of said inorganic acid derivative of the N-monomethyl-p-aminophenol in the presence of an alkali metal salt of said inorganic compound, cooling the mixture to a temperature within 7° C. of 33° C., whereby the aminophenol inorganic acid salt crystals are caused to deposit out.

3. In the process of treating N-monomethyl-p-aminophenol compounds, the step which comprises converting the N-monomethyl-p-aminophenol to its sulfate in admixture with water and sodium sulfate, cooling the mixture to 33° C., whereby aminophenol sulfate crystals are obtained.

4. In the process of treating N-monomethyl-p-aminophenol alkali metal salts, the steps which comprise converting said N-monomethyl-p-aminophenol salts to sulfates by reaction therewith of acid-sodium sulfate, cooling the resultant aqueous mixture containing N-monomethyl-p-aminophenol sulfate and sodium sulfate to a temperature between 32° C.–40° C., whereby N-monomethyl-p-aminophenol sulfate crystals of substantial purity are obtained.

5. A method of obtaining purified N-monomethyl-p-aminophenol sulfate from N-monomethyl-p-aminophenol contaminated with s-dimethyl-p-phenylenediamine, which comprises reacting said contaminated N-monomethyl-p-aminophenol with an alkali metal hydroxide, whereby an alkali metal salt of the aminophenol is formed, passing the resultant admixture countercurrent to steam, the ratio of steam to the aminophenol compound being not materially greater than approximately 1–30, by weight, withdrawing the steamed N-monomethyl-p-aminophenol compound, reacting sulfuric acid therewith to obtain an aqueous solution of N-monomethyl-p-aminophenol sulfate, cooling the aqueous mixture to a temperature between about 32° C. to about 40° C. for causing the deposition of aminophenol sulfate crystals.

6. A method of obtaining N-monomethyl-p-aminophenol sulfate from a crude reaction product which comprises reacting the crude reaction product with an alkali metal hydroxide, whereby an alkali metal salt of the aminophenol is formed, passing the resultant admixture countercurrent to steam, the ratio of steam to aminophenol compound being not materially greater than approximately 1–30 by weight, withdrawing the steamed N-monomethyl-p-aminophenol compound, reacting therewith a reagent from the group consisting of sulfuric acid and acid salts thereof and cooling the resultant aqueous mixture to a temperature between about 32° C. to about 40° C., causing the deposition of aminophenol sulfate crystals.

7. A process in accordance with claim 6, wherein the liquor material remaining after the deposition of said aminophenol sulfate crystals is further cooled to a lower temperature for obtaining a liquor from which further aminophenol salts is recovered and returning at least a part of said liquor to the process.

8. A process for treating crude N-monomethyl-p-aminophenol containing steam volatile impurities which do not form alkali metal salts or become reactive under conditions of treatment, which comprise reacting said crude N-monomethyl-p-aminophenol with an alkali metal hydroxide, whereby an alkali salt of an aminophenol is formed, passing the resultant admixture countercurrent to steam, the ratio of steam to aminophenol compound being not materially greater than approximately 1–30 by weight, withdrawing the steamed N-monomethyl-p-aminophenol compound, reacting therewith a reagent from the group consisting of sulfuric acid and acid salts thereof and cooling the resultant aqueous mixture to a temperature between about 32° C. to about 40° C., causing the deposition of aminophenol sulfate crystals.

9. In a process for preparing N-monomethyl-p-aminophenol, the improvement steps which comprise converting N-monomethyl-p-aminophenate to an inorganic acid derivative wherein said derivative is attached to the amino group, by treatment thereof with an inorganic acid compound from the group consisting of inorganic acids and acid salts of inorganic acids, thereby obtaining an aqueous mixture of said inorganic acid derivative of the N-monomethyl-p-aminophenol in the presence of a soluble metal salt of said inorganic compound, cooling the mixture to a temperature within 7° C. of 33° C., whereby the aminophenol inorganic acid salt crystals are caused to deposit out.

10. In a process for preparing N-monomethyl-p-aminophenol, the steps which comprise converting an N-monomethyl-p-aminophenol to its sulfate in aqueous admixture with an alkali metal sulphate, cooling the mixture to a temperature within 7° C. of 33° C. whereby aminophenol sulphate crystals are caused to separate.

11. In a process for the preparation of N-monomethyl-p-aminophenol, the improvement steps which comprise reacting an aminophenate with a compound from the group consisting of inorganic acids and acid salts of inorganic acids, and subjecting at least a substantial part of the components comprising aminophenol salts and the salts of the inorganic acid in aqueous admixture resulting from the aforesaid treatment, to cooling to a temperature within 7° C. of 33° C.

12. In a process for preparing a purified N-monoalkyl-p-aminophenol by procedure including converting aminophenol to its alkali phenate, subjecting the phenate to countercurrent contact with steam bubbled therethrough, converting the phenate which is being steamed to an inorganic acid salt thereof in solution, the improvement step which comprises cooling the solution containing said salt to a temperature within 7° C. of 33° C.

THOMAS ELLIOTT WANNAMAKER.